United States Patent [19]

Czech

[11] 4,361,774
[45] Nov. 30, 1982

[54] LUBRICATION SLINGER WITH LINT SWEEPER FOR A MOTOR

[75] Inventor: James I. Czech, Lincoln Township, Berrien County, Mich.

[73] Assignee: Whirlpool Corporation, Benton Harbor, Mich.

[21] Appl. No.: 190,910

[22] Filed: Sep. 24, 1980

[51] Int. Cl.³ .............................................. H02K 5/10
[52] U.S. Cl. .................................. 310/90; 184/13 R; 308/36.5; 310/228
[58] Field of Search ................. 308/72, 121, 124, 125, 308/126, 131, 36.4, 36.5; 277/DIG. 4; 184/11 R, 13 R, 16; 310/51, 64, 85, 90

[56] References Cited

U.S. PATENT DOCUMENTS

| | | | |
|---|---|---|---|
| 1,557,191 | 10/1925 | Biddle | 308/168 |
| 1,585,361 | 5/1926 | Bee | 184/13 R |
| 1,639,684 | 8/1927 | Bott | 308/184 R |
| 2,073,830 | 3/1937 | Caley | 310/228 |
| 2,860,931 | 11/1958 | Brooks | 308/36.5 |
| 3,793,543 | 2/1974 | Stokke et al. | 310/90 |
| 3,835,933 | 9/1974 | Coski | 172/518 |
| 3,855,489 | 12/1974 | Hershberger | 310/85 |
| 4,008,928 | 2/1977 | Abel | 308/121 |
| 4,287,662 | 9/1981 | Otto | 29/596 |

Primary Examiner—J. D. Miller
Assistant Examiner—D. L. Rebsch
Attorney, Agent, or Firm—Wegner, McCord, Wood & Dalton

[57] ABSTRACT

A wiper mounted for rotation with the shaft of an apparatus such as an electric motor for preventing wicking by lint collecting on the portion of the housing surrounding the shaft opening thereof. The wiper, in the illustrated embodiment, is carried on the lubricant slinger mounted to the shaft and extending outwardly through the housing opening. The slinger, in the illustrated embodiment, is pressfitted to the shaft so as to permit the wiper to be accurately juxtaposed to the outer surface of the housing defining the shaft opening. In the illustrated embodiment, the wiper is formed integrally with the slinger. The wiper is preferably resiliently carried by the slinger so as to accommodate axial displacement of the motor shaft tending to bring the wiper into engagement with the housing portion defining the shaft opening.

10 Claims, 3 Drawing Figures

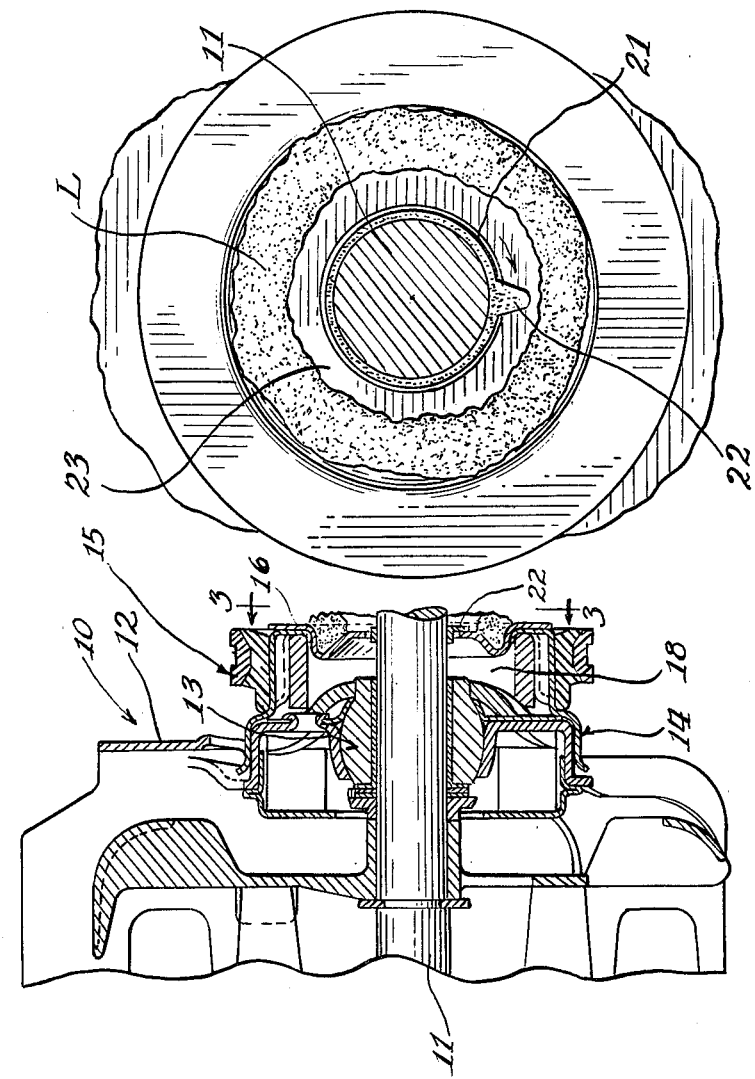
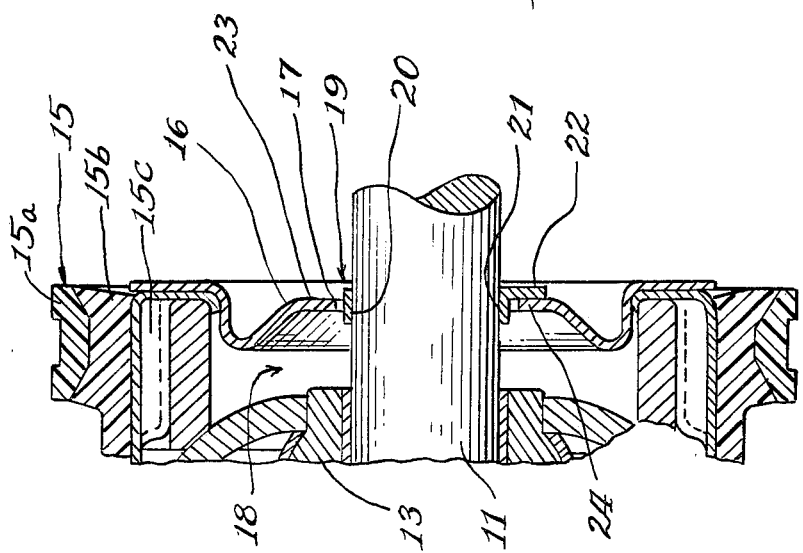

LUBRICATION SLINGER WITH LINT SWEEPER FOR A MOTOR

BACKGROUND OF THE INVENTION

1. Field of the Invention

This invention relates to lubricating means and in particular to means for lubricating the bearings journaling a shaft, such as that of an electric motor.

2. Description of the Background Art

In one form of conventional electric motor, the motor shaft is journaled on suitable bearings carried within the housing of the motor. Means are provided for lubricating the bearings and conventionally include means defining a lubricant reservoir and means for slinging oil or lubricant outwardly as a result of rotation of the motor shaft onto the bearings for continual lubricant circulation thereto. Such lubricant throwing means conventionally comprise lubricant slingers, whch may be mounted to the shaft for rotation therewith.

A problem arises in the use of such motors in atmospheres or environments where lint is present. Such an atmosphere, for example, is found in clothes dryer apparatuses.

In such atmospheres, lint tends to collect on the housing surrounding the motor shaft. It has been found that this collection of lint tends to build up over a period of time and, as a result of the rotary motion of the shaft, forms a wick which may extend from the exposed surface inwardly through the shaft opening and into the motor bearing oil reservoir. The wick thusly formed tends to conduct lubricant from the reservoir outwardly from the housing, thereby depleting the oil and causing failure of the motor bearings.

A number of attempts have been made to solve this vexatious and longstanding problem. Thus, illustratively, Doran D. Hershberger shows, in U.S. Pat. No. 3,855,489, an electric motor having a lint collar secured to the motor shaft in radial alignment within a portion of the end cap of the motor. As seen in each of FIGS. 2, 4, 5 and 6, the different embodiments of the Hershberger collar are adapted to be disposed radially inwardly of the inner edge of the housing opening 45 so as to cause lint that might collect on the shaft 20 between the pulleys 74 and guard 50 to be "inhibited from gaining entry into the bearing housing 34". In another form of seal for protecting bearings against the entry of detritus, such as in earthworking operations, William D. Coski discloses, in U.S. Pat. No. 3,835,933, the use of a plate for covering a sector of the outermost portion of the clearance space between an earth cutter and the shaft thereof. The plate engages an external portion of at least the cutter most adjacent to the clearance space. Means are provided for mounting the plate to the fixed shaft support bracket of the device.

In U.S. Pat. No. 1,557,191 of Ross Biddle, a spindle lubricator is illustrated wherein a button is provided with a knife edge scraping against a front surface of a gear to remove lubricant therefrom and permit the lubricant to flow onto a shelf extending from adjacent the gear to an annular groove on the inner surface of a bearing of the apparatus.

George R. Bott discloses, in U.S. Pat. No. 1,639,684, a dust excluding means including a series of annular plates, each of which has a hub extension so as to space the plates from each other on the shaft. Split washers are provided between the plates. The washers are of somewhat greater diameter than the internal diameter of the inner wall of the bearings and closing casing, but are diametrically contractable as a result of being split so that they are adapted to have a hugging frictional engagement with the outer edges of the wall.

Glenn H. Caley shows, in U.S. Pat. No. 2,073,830, a cleaning pad which is arranged to clean the commutator of an electric motor. The pad is carried by a resilient pressing means which is secured to the frame of the motor while permitting radial adjustment of the pressing means to vary the pressure of the pad on the commutator. The securing means further is arranged to permit rotation of the pressing means about the axis of rotation to permit adjustment of the pad circumferentially of the commutator.

In U.S. Pat. No. 2,860,931, Moses E. Brooks shows, in FIG. 6 thereof, a wiper 27 which wipes off a cylindrical wiping surface having edges which function as slingers. The wiping device is a fingerlike, radially mounted element preferably formed of bronze, nylon or other low friction material supported on a stem slidable in a guide to be urged by a coil spring against the wiping surface. The wiper functions to remove from the wiping surface coolant and lubricant fluids leaking past a pair of seals associated therewith.

SUMMARY OF THE INVENTION

The present invention comprehends an improved means for preventing collection of lint on a housing adjacent a rotatable shaft extending outwardly therefom so as to effectively preclude wicking tending to deplete the lubricant from the reservoir means of the apparatus.

More specifically, the present invention comprehends an improved means for wiping the outer surface of the housing adjacent a shaft opening so as to prevent collection of lint thereon. The wiper of the present invention is mounted to the oil slinger normally provided on the rotatable shaft for effecting desired lubrication of the shaft bearings.

The wiper is preferably resiliently carried on the slinger element so that in the event the shaft is displaced axially to move the wiper into engagement with the surface of the housing, the wiper continues to function to effectively prevent such lint collection.

In the illustrated embodiment, the slinger element is mounted to the shaft for rotation therewith and defines an inner end disposed to intercept lubricant moving axially outwardly along the shaft and to sling the same radially therefrom. The slinger element includes an outer end at the outer surface of the housing opening which carries the wiper so as to cause the wiper to be rotatable with the slinger element and sweep annularly adjacent the outer surface of the portion of the housing provided with the shaft opening, thereby to prevent accumulation of lint on the outer surface.

In the illustrated embodiment, the wiper is formed integrally with the slinger element. Illustratively, the wiper may be formed of resilient material and where formed integrally with the slinger element, the entire device may be formed of resilient material.

In the illustrated embodiment, the slinger element is press-fitted on the shaft to a position wherein the wiper is in accurately preselected spaced relationship to the outer surface of the housing defining the shaft opening.

Thus, the oil slinging structure of the present invention is extremely simple and economical of construction while yet providing the highly desirable lint wick prevention functioning discussed above.

BRIEF DESCRIPTION OF THE DRAWING

Other features and advantages of the invention will be apparent from the following description taken in connection with the accompanying drawing wherein:

FIG. 1 is a fragmentary diametric section of a dynamoelectric apparatus having an oil slinging structure embodying the invention;

FIG. 2 is a fragmentary enlarged diametric section of a portion of the apparatus of FIG. 1 for illustrating more clearly the improved oil slinging structure; and FIG. 3 is a fragmentary enlarged transverse section taken substanially along the line 3—3 of FIG. 1.

DESCRIPTION OF THE PREFERRED EMBODIMENT

In the exemplary embodiment of the invention as disclosed in FIG. 1, a rotary apparatus generally designated 10 is shown to comprise a dynamoelectric device, such as an electric motor (only a portion of which is shown), having an armature shaft 11 extending outwardly through a housing 12 of the motor. More specifically, as seen in FIGS. 1 and 2, the shaft is journaled in suitable bearings 13 (only one being shown) in a portion of the housing generally designated 14, defining an end cap assembly. A resilient composite mounting ring 15 for the motor 10 is retained by an end plate 16. Ring 15 is composed of a hard propylene ring 15a molded to a soft rubber ring 15b having a plurality of teeth 15c that are interfitted with end cap assembly 14 and retained by end plate 16. End plate 16 defines an opening 17 through which the shaft extends to outwardly of the housing. As seen in FIG. 2, the end plate 16 is spaced axially outwardly of the bearing 13 so as to define therebetween a reservoir 18.

An annular slinger 19 is mounted to the shaft 11, as shown in FIG. 2. In the illustrated embodiment, the slinger is press-fitted to the shaft in an accurate, preselected position thereon. The slinger includes an axially inner portion 20 disposed inwardly of the housing end plate 16 for slinging lubricant radially outwardly from the shaft to prevent lubricant escape from reservoir 18 outwardly of the motor housing through opening 17.

As seen in FIG. 2, the slinger extends outwardly through opening 17 to define an outer portion 21. Carried on outer portion 21 is a wiper 22. As seen in FIG. 3, rotation of the shaft 11 causes the wiper to move in an annular path over an outer surface 23 of end plate 16 defining the shaft opening 17. As seen in FIG. 2, the wiper is disposed closely adjacent the housing surface portion 23 as it sweeps about the axis of the shaft 11. Resultingly, as illustrated in FIG. 3, the wiper maintains the surface 23 free of collected lint notwithstanding the use of the apparatus 10 in a lint-laden atmosphere. Thus, as illustratively shown in FIGS. 1 and 3, lint L may collect radially outwardly of the path of movement of the wiper 22, but as this collected lint is spaced from the opening 17, it will have effectively no harmful effect on the operation of apparatus 10.

Also, by maintaining the surface 23 effectively free of lint, wicking of such lint tending to extend inwardly into the reservior space 18 as has occurred in prior art devices is effectively precluded. In such prior art devices, such wicking has caused depletion of the lubricant from a lubricant reservoir, therby causing failure of the bearing. By effectively precluding such wick formation, the wiper 22 provides substantially improved, long trouble-free life of the motor bearings.

As some axial play may occur in the motor shaft 11, it has been found preferable to provide a resilient connection of the wiper 22 to the slinger 19. In the illustrated embodiment, the wiper 22 and slinger 19 are integrally formed as a one-piece unit, and in such a construction, it is desirable to form the unit of a resilient material. Thus, should the shaft 11 become displaced axially so as to bring the wiper into engagement with the housing surface portion 23, the resilient deflectibility of the wiper accommodates such engagement, while effectively maintaining the desirable wiping action, preventing the formation of lint wicking, as discussed above.

As illustrated in FIG. 2, the outer diameter of the slinger 19 is less than the diameter of the opening 17 in end plate 16. However, the wiper finger 22, is illustrated in FIG. 3, extends substantially radially outwardly from the outer surface of the slinger so as to effectively wipe the surface 23 for a substantial distance radially outwardly of opening 17, thereby effectively preventing such wicking, as discussed above.

Thus, the means for preventing lint collection of the present invention comprises an extremely simple, low cost structure which may be carried by the lubricant slinging means of the motor to provide a highly desirable external wiping action effectively precluding buildup of lint as may occur in the prior art devices. The present invention provides a substantial improvement in lint collection prevention over that of the prior art devices wherein collars or walls have been provided on the motor shaft within the housing opening to effectivly reduce the radial dimensions of the opening. Such devices have the serious disadvantage of continuing to premit lint to be built up on the outside of the housing and collar so that the rotational movement of the shaft eventually tends to cause the undesirable wicking notwithstanding the small radial dimensions of the opening. The present invention permits the housing opening clearance to be relatively large while yet effectively preventing the formation of lint wicking extending inwardly therethrough, as discussed above.

Thus, the oil slinger may continue to operate as desired in throwing the lubricant radially outwardly by intercepting the axially outwardly flow thereof along the shaft.

By forming the wiper integrally with the slinger or by suitably mounting the wiper to the slinger, a low cost construction is provided, eliminating the need for a separate collar as provided in the prior art.

The foregoing disclosure of specific embodiments is illustrative of the broad inventive concepts comprehended by the invention.

I claim:

1. In a rotary apparatus having a housing defining an end cap assembly provided with an opening on which assembly lint may be deposited, a shaft rotatively disposed in said housing and having a portion extending outwardly through said housing opening, and fluid lubricant on said shaft in said housing, an improved oil slinging structure comprising:

a slinger element mounted to said shaft for rotation therewith, said slinger element extending through said opening and defining an inner end disposed to intercept lubricant passing outwardly along the shaft and sling the same radially therefrom, and an outer end at an outer surface of said opening; and a wiper finger projecting radially outwardly from said slinger element outer end to be rotatable therewith to sweep seriatim annularly adjacent said outer surface of said opening thereby to prevent accumulation of lint on said outer surface adjacent said opening.

2. The rotary apparatus of claim 1 wherein said wiper is resiliently deflectibly carried on said slinger element.

3. The rotary apparatus of claim 1 wherein said wiper is mounted to said slinger element by resilient connecting means.

4. The rotary apparatus of claim 1 wherein said wiper is formed integrally with said slinger element.

5. The rotary apparatus of claim 1 wherein said wiper is formed of resilient material integrally with said slinger element.

6. In an electric motor for use in an atmosphere wherein lint may be present and having a housing defining a portion provided with an opening on which portion lint may be deposited, an armature shaft rotatively journaled in a bearing in said housing and having a portion extending outwardly through said opening, and lubricating means in said housing for providing lubricant to said bearing, and lubricating means defining a lubricant reservoir in said housing, improved oil slinging structure comprising:

an annular slinger element mounted to said shaft for rotation therewith, said slinger element extending through said opening and defining an inner lubricant slinging portion for radially slinging said lubricant in said reservoir and an outer mounting portion at an outer surface of said opening; and a wiper finger carried by said slinger element mounting portion to be rotatable therewith to sweep seriatim annularly adjacent said outer surface to prevent accumulation of lint on said outer surface adjacent said opening tending to form a wick extending inwardly through said opening to said reservoir.

7. The electric motor structure of claim 6 wherein said slinger element is fitted to said shaft to position said outer mounting portion in accurately preselected spaced relationship to said outer surface.

8. The electric motor structure of claim 6 wherein said slinger element is press-fitted to said shaft to position said outer portion in accurately preselected spaced relationship to said outer surface.

9. The electric motor structure of claim 6 wherein said wiper comprises a finger projecting radially from said slinger element outer portion.

10. The electric motor structure of claim 6 wherein said slinger element has an outer diameter less than the diameter of said opening and said wiper projects radially outwardly to substantially beyond the outer diameter of said opening.

* * * * *